United States Patent [19]

Gläser et al.

[11] Patent Number: 5,350,553
[45] Date of Patent: Sep. 27, 1994

[54] METHOD FOR THE MANUFACTURE OF A DECORATED CHIP CARD

[75] Inventors: Arnaldo A. Gläser, Neunkirchen; Hans-Joachim Kaufhold, Fuecht, both of Fed. Rep. of Germany

[73] Assignee: Mannesmann Aktiengesellschaft A Corp of the Federal Repbulic of Germany, Dusseldorf, Fed. Rep. of Germany

[21] Appl. No.: 799,554

[22] Filed: Nov. 27, 1991

[30] Foreign Application Priority Data

Nov. 27, 1990 [DE] Fed. Rep. of Germany ....... 4038126

[51] Int. Cl.⁵ .................... B29C 45/14; B29C 45/16; B29C 33/12
[52] U.S. Cl. ................................. 264/155; 264/132; 264/153; 264/261; 264/272.15; 264/272.17; 264/511
[58] Field of Search ................ 264/259, 272.15, 271.1, 264/261, 132, 511, 157, 160, 510, 153, 265, 266, 272.17, 272.11, 261, 155

[56] References Cited

U.S. PATENT DOCUMENTS

| | | |
|---|---|---|
| 4,792,843 | 12/1988 | Haghiri-Tehrani ............. 264/272.11 |
| 4,873,041 | 10/1989 | Masui et al. .................... 264/272.11 |
| 4,961,893 | 10/1990 | Rose ................................ 264/272.11 |
| 5,164,144 | 11/1973 | Rose ................................ 264/259 |

FOREIGN PATENT DOCUMENTS

| | | |
|---|---|---|
| 254444 | 1/1988 | European Pat. Off. . |
| 297991 | 7/1988 | European Pat. Off. . |
| 277854 | 8/1988 | European Pat. Off. . |

*Primary Examiner*—Jan H. Silbaugh
*Assistant Examiner*—Angela Y. Ortiz
*Attorney, Agent, or Firm*—Cohen, Pontani, Lieberman, Pavane

[57] ABSTRACT

A method of producing a decorative pattern on a plastic card housing an electronic circuit in an injection molding machine, includes the steps of introducing and positioning a film, which has applied on at least one surface thereof a decorative pattern, in an open cavity of the injection molding machine, closing the cavity so that the film is fixed and clamped in position, after the closing of the cavity, inserting an electronic circuit chip through an aperture into the mold cavity, injecting a support composition for the card into the mold cavity, and after termination of the injection process, removing the gate or any excess material from the periphery of the card, opening the mold cavity and removing the decorated card.

6 Claims, 2 Drawing Sheets

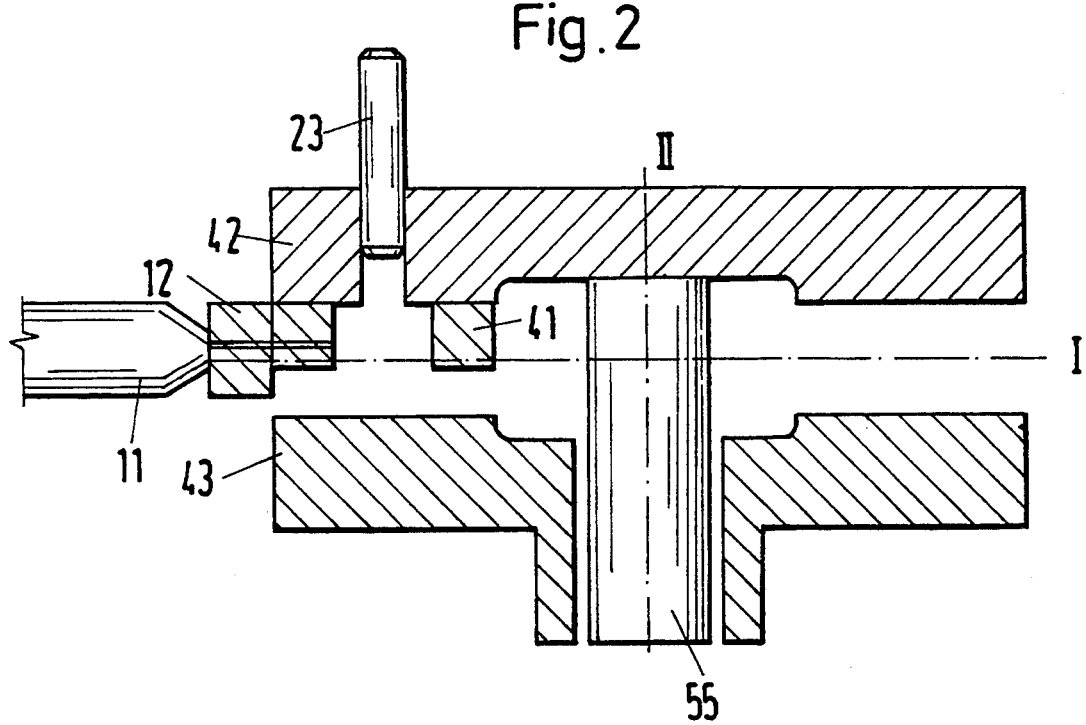
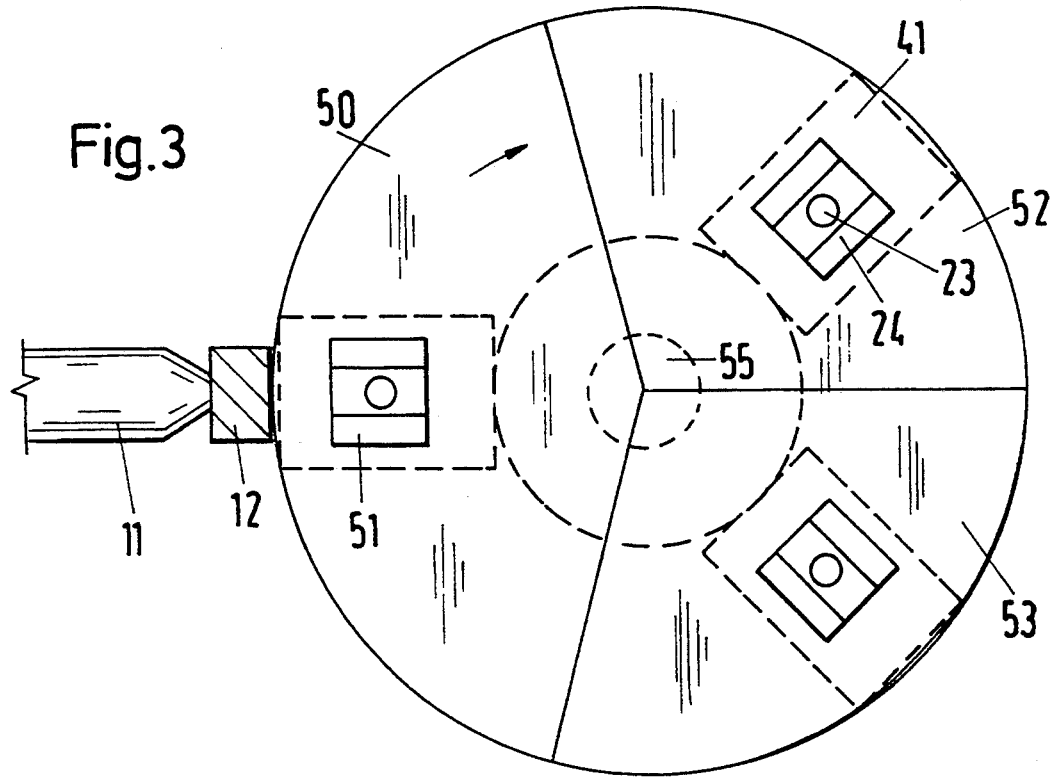

METHOD FOR THE MANUFACTURE OF A DECORATED CHIP CARD

FIELD OF THE INVENTION

The present invention relates to a method of manufacturing a decorated chip card, also known as a smart card, and to a mold of an injection molding machine for the manufacture of such a chip card.

BACKGROUND OF THE INVENTION

A chip card is a card-like device formed primarily of plastic having a credit card format, which has incorporated therein an electronic device or semi-conductor chip. This semi-conductor chip may, for instance, store password data or identifying code data or bank or telephone account data. It may also store account balance information, or be encoded with a "value" which may be used in transactions instead of money, or may be incremented by the purchase of extra "value" points. As compared with magnetically encoded stripes, semi-conductor chips may provide greater security against destruction and/or change of data. In addition, the provision of electronic circuits allows increased data storage and, under certain circumstances, additional functionality. These electronic devices, as well as their interface with associated information reading and recording apparatus, are well known, and need not be explained in detail. The present invention relates to a method of applying decorative graphics to smart cards, and is adaptable to the various smart card formats.

Cards are used by the issuers as advertising supports and also are identified through their surface markings, such as multicolor graphics. In this connection, increasingly greater demands are being made on the design and the nature of the surface of the cards. Thus, these surface marking serve a number of purposes. First, the markings serve to identify the card to both the user and to a merchant. Second, the markings serve to make the cards difficult to counterfeit. Finally, the markings serve to promote the issuer or sponsor of the card. Thus, while the graphics essentially do not affect the function of the card related to the associated electronics, they nevertheless serve an important purpose. Further, the graphics may also be used for positioning the card during its use, and to provide information or instructions.

German Unexamined Patent Application DE OS 31 30 135, incorporated herein by reference, discloses a method for the manufacture of a chip card with data-processing functions, which has a semiconductor chip in which the casting around the support card and the installation of the chip are carded out in two operating steps. The decoration of the chip card is not described in DE OS 31 30 135.

Ordinarily, the card, provided with a chip, is provided with decoration in a separate step, and at a separate station in the manufacturing apparatus, from where the plastic card is molded with the electronic circuit embedded in the card. The need for the expensive and difficult three-dimensional matching of finished chip supports and the applied decoration is a disadvantage in this connection. Thus, the chip cards are subjected to an expensive, time-intensive process after the chip is imbedded in the card.

THE OBJECTS OF THE PRESENT INVENTION

It is therefore an object of the invention is to provide a method and an apparatus for the manufacture of chip cards in order to produce completely decorated chip cards rapidly and reliably with structurally simple means.

It is a further object of the present invention to apply the surface graphic to a plastic chip card during a molding operation which embeds the electronic chip in the card.

It is an object of the present invention to provide a method of producing a decorative pattern on a plastic card housing an electronic circuit in an injection molding machine, comprising the steps of introducing and positioning a film, which has applied on at least one surface thereof a decorative pattern, in an open cavity of the injection molding machine, closing the cavity so that the film is fixed and clamped in position, after the closing of the cavity, inserting an electronic circuit chip through an aperture into the mold cavity, injecting a support composition for the card into the mold cavity, after termination of the injection process, punching out the gate, i.e. the impression of the mold gate or runner, to form a card of the final shape, opening the mold cavity and removing the decorated card, and a means for practicing this method.

It is another object of the present invention to stamp a window in the film, positioned on the side of the mold from which the electronic circuit chip is inserted. The chip is then positioned in the cavity, through the window, by means of a pressing means for applying force, finally locating the chip at a position where the chip extends between about 80 to about 90% of its height into the cavity.

It is a further object of the present invention to provide a method of forming a chip card wherein the mold has a plurality of molding positions and the positioning of the films and the injection of the support composition of the card are effected simultaneously in different mold positions.

It is also an object of the present invention to provide an injection molding machine having a mold into the cavity of which support compositions can be injected by an injection device in order to produce a decorated chip card, wherein the mold has two housing parts, a cover part and a bottom part, which are movable perpendicular to the central plane of the cavity of the injection molding machine, and a stationary ring which surrounds the cavity is arranged between the housing side parts. Film-transport devices are arranged on at least one of the housing side pans. One housing side part has a chip feed which has elements for holding the chip, which is a laterally movable holding ram, and channels are provided for connecting a pneumatic actuator in the holding ram.

It is a still further object of the present invention to provide a mold with film-transport devices arranged on the side of the cover part or bottom part which faces away from the cavity.

It is another object of the present invention to provide a mold in which corresponding sealing surfaces are provided on the housing parts and on the ring. The sealing surfaces may be formed so that decorative films can be guided on the side of the housing side parts facing the cavity and, with the mold closed, can be clamped on at least two sealing surfaces.

It is a still further object of the present invention to provide, in addition to the film-transport device arranged on the cover side, a film stamping die for producing a chip-insertion window in the film on the one housing side part.

It is another object of the present invention to provide a molding apparatus for the molding of a chip-card, wherein the electronic chip is inserted in the mold by a pneumatic holding ram, and wherein the holding ram also serves as a stamper for cutting the electronic chips out of a support foil.

It is a still further aspect of the present invention to provide a molding apparatus in which the cover and bottom pans are components of a turntable which can be turned into the various working positions for injection, card removal and component insertion. The working positions for card removal and component insertion may also be combined into a removal/insertion operating position. The turntable may advantageously have an axis of rotation which is perpendicular to the central axis of the injection molding machine, with the cover and bottoms parts mounted so that they are movable parallel to the axis of rotation.

SUMMARY OF THE INVENTION

The chip card of the present invention is produced as a finished product in a production cell of the molding machine in the following manner. With the cavity open, decorations arranged on films are introduced in the region of the cavity by means of film-transport devices. The film can be properly positioned in the open cavity by known means, e.g. mechanical, optical position sensing devices. Upon the closing of the cavity, the film is held in its position and fixed in the closed cavity by clamping. In other words, the decoration, on the film, is positioned properly with respect to the open mold, which is then closed, the mold elements adapted to hold the film in place during the molding operation.

The plastic molding composition is forced into the closed cavity by known means. The plastic molding may be any suitable plastic composition which is capable of being injection molded, stiff but not brittle when cooled, and does not electrically or chemically interfere with the operation of the electronic circuit. The heated plastic composition attaches itself to the decoration on the film, which is held fast in position in the cavity by the cover and bottom of the mold, and at the same time adheres to the chip which has also been positioned in the mold cavity prior to the injection molding.

Depending on the required or desired external appearance of the chip card, one or two decorated films can be inserted into the mold cavity prior to molding. If only one film is used, it preferably is decorated on both sides. When a single film is used, it is preferable to arrange it on the side of the cavity opposite the side of the cavity used for the feeding of the chip into the mold. In such an arrangement, the film does not interfere with the insertion of the electronic chip, and there is therefore no need to form an aperture in the film.

If a decoration is provided on the chip side of the card, then the film arranged on the chip side is preferably provided, before being fed into the cavity, with an opening through which the chip can be passed, so that there is an aperture positioned at the intended location of the chip in the card.

The chips, arranged on a support foil, are punched out from the foil and fed into the cavity by a known mechanical device. Of course, other known means of providing an electronic chip to a production device may be employed, according to known methods. Upon introduction of the chip into the empty cavity and throughout the duration of the injection process, the chip is held precisely in its position perpendicular to the wide side of the cavity. Thus, the chip may be accurately held in position in 6 axes of freedom, including length, width, height, roll, pitch and yaw.

After production of the chip card, it is advantageous if the chip extends beyond the top edge of the card because of the known functional considerations. During the attachment of the chip and the injected plastic composition during the manufacturing process, the chip can be initially fixed in its depth of penetration into the cavity, or it can be forced back with the penetrating plastic composition from a completely immersed position to the final dimension with respect to the surface. The chip preferably extends out from the surface of the finished card to the extent of about 10 to about 20% of the total height of the chip. Thus, the electronic chip may be inserted between about 80 to about 90% into the cavity and held fixed in position, or it may be fully inserted in the cavity and then allowed to move back so that about 10 to about 20% of its height extends beyond the surface.

After the completion of the injection molding, the gate, or impression of the mold runner or gate, is punched out, the cavity is opened, and the chip card is removed. A new cycle for the manufacture of a decorated chip card can then commence. The mold gate forms a tab of extra material, which must be removed to form a card of the final shape. This is preferably removed while the card is in the mold.

The mold of the injection molding machine for the manufacture of decorated chip cards has a ring which is detachably fastened on the injection molding machine. This ring forms the side wall of the cavity, while both the cover and bottom consist of housing parts of the injection mold. During the molding process, the ring is pressed tightly against both the cover and bottom, so that a seal is formed, confining the molding compound to the mold cavity. Upon the closing and opening of the cavity, the housing parts are moved perpendicular to the center axis towards and away from the ring, respectively. The ring and the other housing parts which form the cavity can be arranged vertically or horizontally.

Before the introduction of the plastic molding composition into the cavity, the housing pans are pressed against the ring in the region of the sealing surface, thereby avoiding leakage of the plastic composition in the region of the edge of the casting mold. In order to prevent slipping or undesirable movement of the film, a clamping edge is preferably provided on the deflection sides of the housing in the direction of conveyance of the film.

After the solidification of the plastic molding composition of the card base support, including the material in the mold gate region forming the gate, the runner is stamped off. The mold is then opened by moving the cover and/or bottom away from the ring. In this connection, the chip card detaches itself from the decoration support film leaving the decoration affixed to the card. The vacuum is reduced in the device for the holding of the chip, which is now firmly attached to the card. The distance between a housing part and the ring is preferably made greater on the chip side than the height of the chip card, including the protruding end of the chip. Thereupon, the chip card is conveyed out of the mold. It is of course understood that the present mold may incorporate other features known to those skilled in the art, for example temperature controls, cooling apparatus, and static discharge elimination devices (to protect the electronic chip).

Monocells can be used, which are arranged horizontally or vertically. The advantage of using a monocell is the possibility of using standard injection molding devices, and thus being able to apply known and developing technologies to the apparatus of the present invention.

In order to shorten the cycle time, a turntable may be used. Such a turntable preferably has three working positions, namely injection of the molding compound, removal of the completed card and insertion of the chip from the exterior of the mold cavity In another preferred embodiment, the operating positions "removal" and "insertion" can be combined, so that only two stations need be provided. In order further to reduce the cycle time, several sets of working positions can be arranged on the turntable.

The turntable can be arranged horizontally or vertically. A vertical arrangement of the turntable is especially preferred because injection in the parting plane can be dispensed with without a deflection of the heating channel being necessary. Furthermore, the turntable in such orientation fixes itself in position by the force of gravity.

BRIEF DESCRIPTION OF THE DRAWINGS

The invention will be described in further detail below with reference to the figures in the accompanying drawings, in which:

FIG. 2 is a section through a turntable of the present invention; and

FIG. 3 is a top view of a turntable of the present invention.

DETAILED DESCRIPTION OF THE PREFERRED EMBODIMENTS

Figure 1:
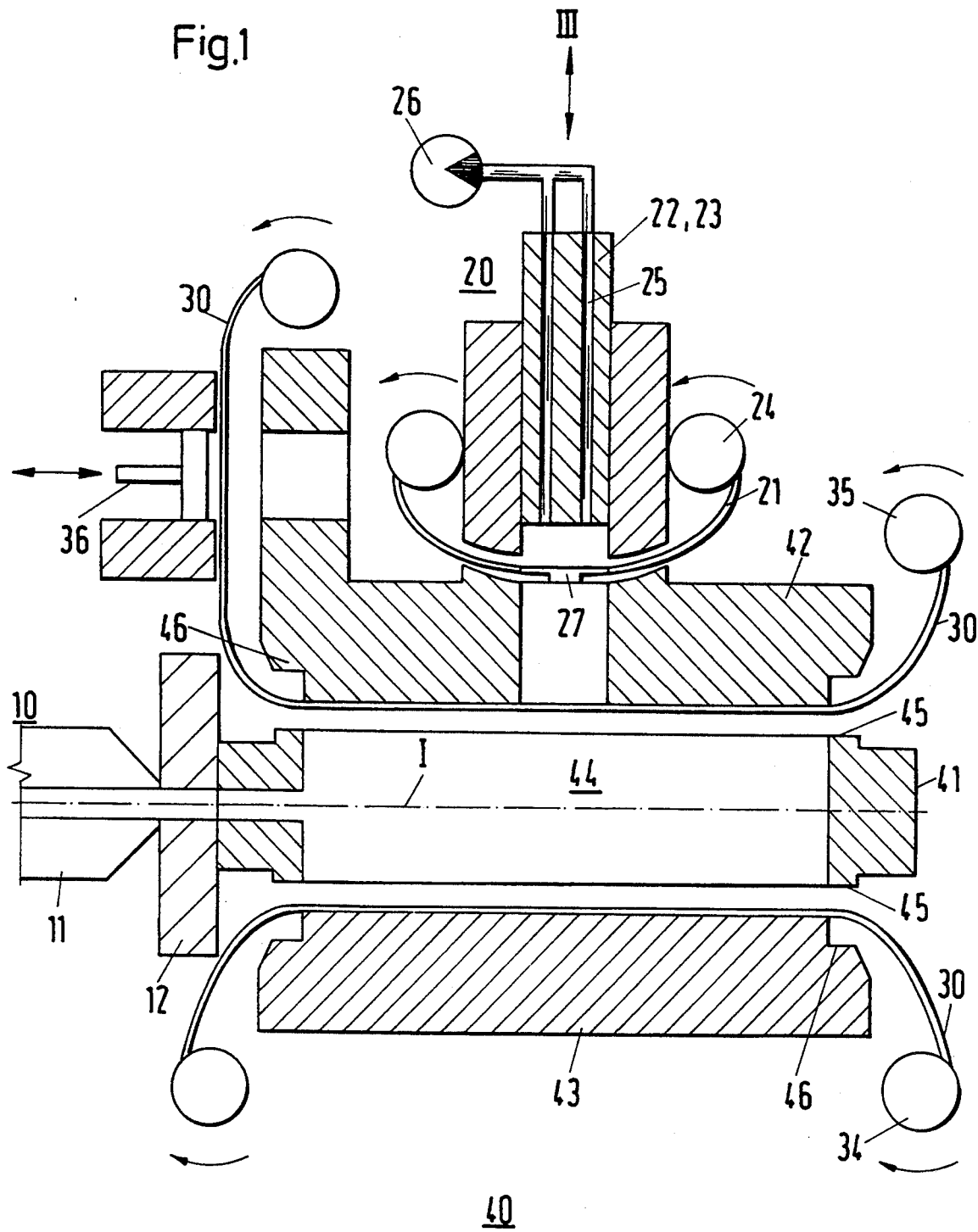
FIG. 1 is a section through the mold of the present invention in the region of the ring.

FIG. 1 shows an injection head 11 of an injection molding machine 10, not further shown. Between the injection head 11 and the cavity 44 of the mold 40, there is a heating channel 12. The heating channel 12 is pressed against a ring 41, an opening being provided in the ring 41 which encircles the mold cavity 44 in the parting plane I of the mold 40. Through the opening in the ring 41, the plastic material can pass from the injection molding machine 10 through, the heating channel 12 into the cavity 44. The housing parts 42 and 43 can be pressed against or moved away from the ring 41, in order to close or open the mold. The ring 41 has circumferential sealing surfaces 45 which correspond to corresponding sealing surfaces 46 of the housing parts 42 and 43.

A chip feed device 20 is provided on the housing part 42. The chip feed device 20 has drives 24 by which means a support foil 21 can be passed through the ram axis III. In the chip feed device 20, a holding ram 23 is movable in an axial direction, perpendicular to a face of the housing part 42. The holding ram 23 has channels 25 which are in communication with a pneumatic pump 26, or the like. Thus, the holding ram 23 is pneumatically actuated, and may be controlled in known manner. Of course, other methods, such as hydraulic or electromechanical means could be adapted to control the holding ram 23. The holding ram 23 can take the form of a stamper 22, in which case, it would serve the additional function of stamping the electronic chip 27 from a support foil 21, and then holding the chip for insertion in the mold cavity.

A film-transport device 35 is provided on the housing part 42 for the movement of a decorative film 30. The decorative film 30 has (not shown in the present sketch) a plastic layer, an insulating layer, and a color layer. These elements are of known type, and the color layer may be formed in an arbitrary pattern, to provide identification, recognition and security. The decorative film 30 may also serve other, compatible functions.

On the housing pan 42, arranged on the chip insertion side of the apparatus, there is furthermore provided a film stamper 36 which stamps windows or apertures of a size corresponding to the chip 27 in the decorative film 30, so that the chip 27 may be inserted through the aperture during the insertion and molding process.

A film-transport device 34 is provided on the housing part 43 arranged on the bottom side, opposite the chip feed device 20.

FIGS. 2 and 3 show a turntable 50 having a king pin 55. The turntable has housing parts 42 and 43 which are movable with respect to each other, and between which a ring 41 can be pressed to form a mold cavity. The heating channel 12, which is in communication with the injection head 11, is arranged on the ring 41, in communication therewith, so that a flow channel is available through the ring into the mold cavity.

A holding ram 23 is arranged on the housing side 42.

The turntable 50, which is rotatable around the axis of rotation II, bears the operating positions denominated molding compound injection 51, card removal 52 and electronic chip insertion 53. In a further advantageous embodiment of the present invention, possibilities for variations such as alteration of the insertion/removal work position, as well as the possibility of the arrangement of several sets of work positions on a turntable, have not been shown separately, but are included in the scope of the present invention.

It should be understood that the preferred embodiments and examples described are for illustrative purposes only and are not to be construed as limiting the scope of the present invention which is properly delineated only in the appended claims.

What is claimed is:

1. A method of producing a decorative pattern on and placing an electronic circuit in a plastic card in an injection molding machine, said method comprising the steps of:
    (a) introducing and positioning a first film, which has applied on at least one surface thereof a decorative pattern, over an open mold cavity in a mold of the injection molding machine;
    (b) closing the mold cavity so that the first film is fixed and clamped in position therein;
    (c) after tile closing of the mold cavity, inserting, an electronic circuit chip through an aperture in the mold into the mold cavity to position the chip in the cavity;
    (d) subsequently injecting a support composition for the card into the mold cavity to adhere to the first film and chip and to form the card; and
    (e) thereafter, removing excess material, opening the mold cavity and removing the card.

2. The method according to claim 1, additionally comprising the step of introducing a second film, having a decorative pattern applied to one surface thereof, into the mold cavity parallel to the first film.

3. The method according to claim 2, additionally comprising the step of stamping a window in the first film, which is to be positioned on the side from which the electronic circuit chip is inserted into the mold cavity.

4. The method according to claim 1, additionally comprising the steps of introducing the chip completely into the mold cavity and, after injection of the support composition, moving the chip back from the cavity until between about 10% and about 20% of its height extends beyond a card surface.

5. The method according to claim 1, additionally comprising the step of introducing the chip into the mold cavity to a position where the chip extends between about 80% and about 90% of its height into the cavity.

6. The method according to claim 1, wherein the injection molding machine comprises a plurality of molding positions, additionally comprising the steps of positioning the mold in one of the plurality of molding positions and then positioning the film and injecting the support composition of the card simultaneously in different mold positions.

* * * * *